United States Patent [19]

Tamai et al.

[11] Patent Number: 5,374,708
[45] Date of Patent: Dec. 20, 1994

[54] FORMED POLYIMIDE ARTICLE

[75] Inventors: Shoji Tamai, Yokohama; Masahiro Ohta, Ohmuta; Akihiro Yamaguchi, Kamakura; Masumi Saruwatari, Nagoya, all of Japan

[73] Assignee: Mitsui Toatsu Chemicals, Incorporated, Tokyo, Japan

[21] Appl. No.: 741,460

[22] PCT Filed: Dec. 21, 1990

[86] PCT No.: PCT/JP90/01679

§ 371 Date: Aug. 8, 1991

§ 102(e) Date: Aug. 8, 1991

[87] PCT Pub. No.: WO91/09900

PCT Pub. Date: Jul. 11, 1991

[30] Foreign Application Priority Data

Dec. 22, 1989 [JP] Japan ................... 1-330980

[51] Int. Cl.$^5$ ............ C08G 73/10; C08G 69/26; B29C 47/38; B29C 47/88
[52] U.S. Cl. ................... 528/353; 528/125; 528/128; 528/172; 528/173; 528/176; 528/183; 528/185; 528/188; 528/220; 528/229; 528/350; 428/395; 428/473.5; 264/176.1; 264/177.13; 264/177.17; 264/178 F; 264/211.12; 264/211.14; 264/211.21; 264/208
[58] Field of Search ............. 528/353, 125, 128, 172, 528/173, 176, 183, 185, 188, 220, 229, 350; 264/176.1, 178 F, 177.13, 177.17, 211.12, 211.14, 208, 211.21; 428/473.5, 395

[56] References Cited

U.S. PATENT DOCUMENTS

| | | | |
|---|---|---|---|
| 4,839,232 | 6/1989 | Morita et al. | 428/473.5 |
| 4,847,349 | 7/1989 | Ohta et al. | 528/125 |
| 5,013,817 | 5/1991 | Ohta et al. | 528/353 |
| 5,043,419 | 8/1991 | Ohta et al. | 528/353 |

FOREIGN PATENT DOCUMENTS

| | | |
|---|---|---|
| 61-143435 | 7/1986 | Japan . |
| 62-205124 | 9/1987 | Japan . |
| 63-211319 | 9/1988 | Japan . |
| 2-178017 | 7/1990 | Japan . |
| 2-209924 | 8/1990 | Japan . |
| 2-234911 | 9/1990 | Japan . |
| 3-47837 | 2/1992 | Japan . |

OTHER PUBLICATIONS

CA 108: 222780s, "Storage-stable polyimide fiber composites", Koba et al, Jun. 27, 1988.
Sen-I Gakkaishi, May 15, 1984, "High Tenacity and High Modulus Fibers From Wholly Aromatic Polyimides", T. Jinda et al, pp. 42–49.

Primary Examiner—John Kight, III
Assistant Examiner—P. Hampton-Hightower
Attorney, Agent, or Firm—Burns, Doane, Swecker & Mathis

[57] ABSTRACT

Polyimide filaments and polyimide films having great strength, high elastic modulus and high crystallinity and comprising a novel polyimide which can be melt-processed without impairing high crystallinity and which essentially consists of recurring structural units represented by the formula (I):

$$\left[ \begin{array}{c} \text{structure with } Q_1, Q_2, \text{ imide groups} \end{array} \right] \quad (I)$$

more than 85 mol % the polyimide consists of recurring structural units of the formula (II):

$$\left( \begin{array}{c} \text{structure II} \end{array} \right) \quad (II)$$

and from 0.5 to 15 mol % of the polyimide consists of recurring structural units represented by the formula (III), the formula (II) exclusive, the formula (IV) and/or the formula (V).

19 Claims, No Drawings

FORMED POLYIMIDE ARTICLE

BACKGROUND OF THE INVENTION

1. Field of the Invention

The present invention relates to a formed polyimide article essentially consisting of a novel polyimide and particularly relates to a polyimide filament and a polyimide film.

2. Description of the Related Art

Aromatic polyimides have excellent mechanical properties and solvent resistance in addition to the highest heat resistance in organic polymers. For example, KAPTON and Vespel (Trademarks of E.I. Du Pont de Nemours & Co.) are polyimides obtained by reaction of bis(4-aminophenyl) ether with pyromellitic dianhydride and have been practically used in the form of film or molded articles. These polyimides, particularly polypyromellitimide prepared from aromatic diamine and pyromellitic dianhydride, have a straight chain polymer structure and high crystallinity. However, the research on polyimide filaments composed of polypyromellitimide has been found only in M.M. Katon, Polym. Sci. USSR. 21, 2756 (1980), although the material has possibility for use in filaments having great strength and high elasticity of modules. Poly(4,4'-biphenylenepyromellitimide) filament has relatively high strength in the filaments thus obtained, nevertheless the strength is only 6.9 g/d. The reason for such low strength is that melt spinning is impossible because of poor processability of conventional polypyromellitimide, dry spinning is also impossible because of insolubility in most solvents, and hence the filament can only be prepared by a wet spinning process. In the wet spinning process, unstable polyamic acid which is the precursor of polyimide is subjected to wet spinning, followed by hot water stretching and hot cyclization to obtain polyimide filaments.

Recently, Kanda et al. intended in Sengakushi, 40, T-480(1980) to enhance stretchability of polyimide by the sacrifice of high crystallinity of polypyromellitimide, and used tetracarboxylic acid dianhydride having a flexible linkage such as an ether bond or a carbonyl bond in the molecule. Thus, bis(3,4-dicarboxyphenyl) ether dianhydride or 3,3',4,4'-benzophenonetetracarboxylic dianhydride were reacted with 2-chlorobenzidine or 2-chloro-p-phenylenediamine as a diamine component to obtain polyimide having low crystallinity. The filament prepared from the polyimide obtained had a strength of 19.7 g/d.

As a result of introducing a crystallinity lowering structure in order to improve stretchability, modulus of elasticity is decreased to a low level of 1380 g/d and overall performance as a heat-resistance filament becomes unsatisfactory. Further, a highly crystalline polypyromellitimide which can expect a further increase in modulus of elasticity in view of its polymer structure was prepared from benzidine and pyromellitic dianhydride. The polyimide monofilament obtained from the polypyromellitimide had also inferior properties such as strength of 7.7 g/d and elastic modulus of 880 g/d. These properties also result from inferior processability of conventional polypyromellitimide. That is, the filament can only be prepared by wet spinning wherein a portion of polyamic acid precursor is chemically imidized and then spun and followed by stretching and heat treatment to give a polyimide filament.

In order to solve these problems, the present inventors have already found a novel polyimide which has both high crystallinity of polypyromellitimide and melt spinning ability and is represented by the formula (II):

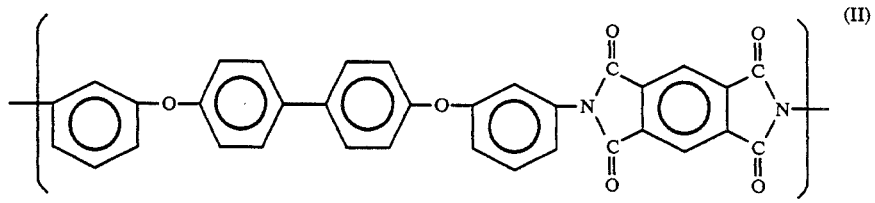

(Japanese Patent Laid-Open 205124 (1987))

and have obtained a polyimide which has great strength and high modulus elasticity as disclosed in Japanese Patent Laid-Open 211319 (1988).

However, the polyimide represented by the above formula (II) has a high crystal-melting point (Tm) of 388° C. and causes a problem that processing such as filament spinning must be carried out at a high temperature around 400° C. Consequently, it has been desired to further improve processability without giving adverse effect on the crystallinity.

On the other hand, conventional polyimide prepared from bis(4-aminophenyl) ether and pyromellitic dianhydride as mentioned above cannot be melt-formed. Accordingly, a film is prepared by a so-called solution casting method wherein a polyamic acid precursor is cast, solvent is removed and the residual film is heat-treated. Consequently, problems of poor productivity and high cost have been encountered.

Much research has recently been carried out on thermoplastic polyimide in order to improve the processability of polyimide. One of the results is a noncrystalline polyetherimide having the polymer (a):

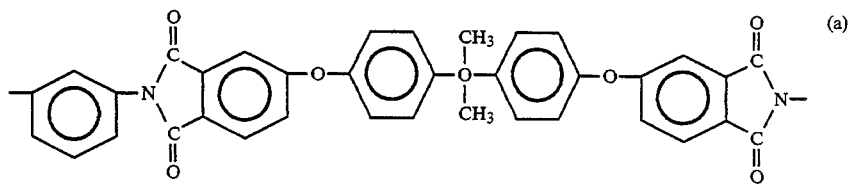

The polyetherimide has a low Tg of 215° C., and softens and can deform at a temperature above the Tg. On the other hand, the polyetherimide has disadvantages of no solder heat resistance and susceptibility to solvents. Japanese Patent Laid-Open 205124 (1987) has disclosed a novel crystalline polyimide having recurring structural units of the formula (II).

The polyimide can be melt-processed and also has great strength, high elastic modulus and excellent heat and solvent resistance. However, the polyimide is crystalline and must be melt-processed at temperature above Tg of the polyimide. High processing temperature of around 400° C. is hence required for forming film by melt extrusion and fish eyes and die lines tend to occur. As a result, it is a problem that a high level of processing technique is required for producing good films. Further, the crystallization speed of the polyimide cannot be controlled and hence leads to a disadvantage that stretching conditions are limited to a very narrow range.

The present inventors have developed a process for controlling the rate of crystallization alone without impairing the high crystallinity of polypyromellitimide represented by the above formula (II) as disclosed in Japanese Patent Application 090674 (1989). Thereby they have found a novel polyimide having good processability and being capable of melt spinning and succeeded in obtaining a polyimide filament of high elastic modulus. Thus the present invention has been completed.

SUMMARY OF THE INVENTION

One object of the present invention is to provide formed polyimide articles, that is, a polyimide filament and a polyimide film having great strength and high elastic modulus and comprising a novel polyimide which has good processability and high crystallinity.

As a result of an intensive investigation in order to accomplish the above object, the present inventors have found that formed articles, that is, a polyimide filament and a polyimide film having great strength and high elastic modulus can be obtained from the polyimide represented by the below described formula (I).

Accordingly, one aspect of the invention is a formed polyimide article, that is, a polyimide filament and a polyimide film comprising a polyimide essentially consisting of recurring structural units represented by the formula (I):

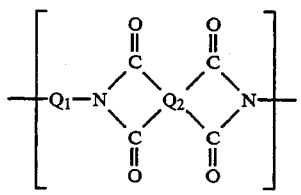

wherein $Q_1$ and $Q_2$ are radicals selected from the group consisting of an aliphatic, alicyclic, monoaromatic and condensed aromatic radical and noncondensed aromatic radical connected with each other through a direct bond or bridge member, $Q_1$ is a divalent radical and $Q_2$ is a tetravalent radical, more than 85 mol % of said polyimide consisting of recurring structural units of the formula (II):

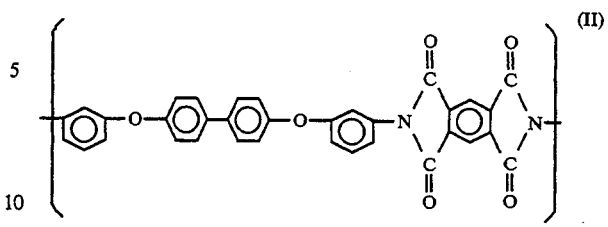

and from 0.5 to 15 mol % of said polyimide consisting of recurring structural units represented by the formula (III), the formula (II) exclusive, the formula (IV) and/or the formula (V):

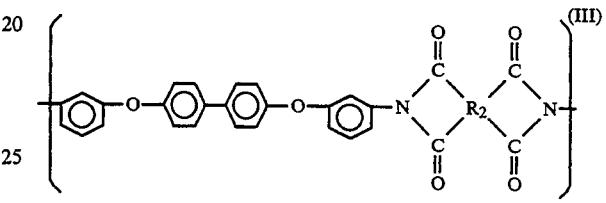

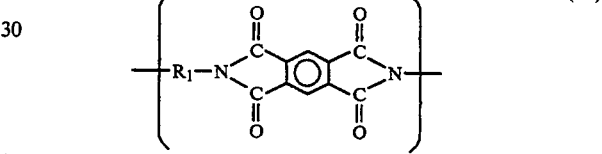

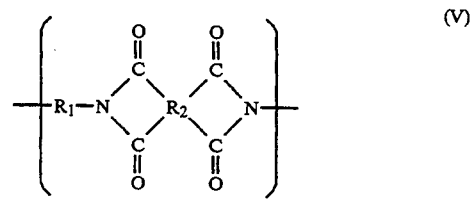

wherein $R_1$ and $R_2$ are radicals selected from the group consisting of an aliphatic, alicyclic, monoaromatic, condensed aromatic radical and noncondensed aromatic radical connected with each other through a direct bond or bridge member, $R_1$ is a divalent radical and $R_2$ is a tetravalent radical.

DESCRIPTION OF THE PREFERRED EMBODIMENTS

The polyimide of the present invention is obtained by conducting the condensation of 4,4'-bis(3-aminophenoxy)biphenyl having the formula (VI):

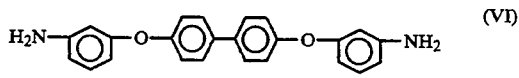

and pyromellitic dianhydride having the formula (VII):

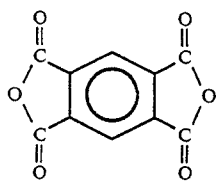 (VII)

in the presence of a diamine compound represented by the formula (VIII):

 (VIII)

wherein R₁ is a divalent radical selected from the group consisting of an aliphatic, alicyclic, monoaromatic and condensed aromatic radical and noncondensed aromatic radical connected with each other through a direct bond or bridge member, and the diamine compound of the formula (VI) is excluded, and/or a tetracarboxylic acid dianhydride represented by the formula (IX):

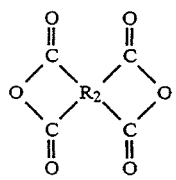 (IX)

wherein R₂ is a tetravalent radical selected from the group consisting of an aliphatic, alicyclic, monoaromatic and condensed aromatic radical and noncondensed aromatic radical connected with each other through a direct bond or bridge member and the pyromellitic dianhydride of the formula (VII) is excluded. The polyimide of the invention is highly crystalline and the speed of its crystallization alone can be freely controlled by the amounts of the above diamine compound of the formula (VIII) and/or the tetracarboxylic acid dianhydride of the formula (IX) which are respectively in the range of from 1 to 30 mol % per mole of the main materials, i.e., 4,4'-bis(3-aminophenoxy)biphenyl of the formula (VI) and/or pyromellitic dianhydride of the formula (VII), and which are present in the range of 0.5 to 15 mol % in the total amount per mole of the total monomer used.

The polyimide of the invention is a highly crystalline polyimide having the same heat resistance, crystallinity and thermal plasticity as the polyimide represented by the above formula (II) and being capable of melt spinning or melt forming.

The compounds used for the main materials of the invention are 4,4'-bis(3-aminophenoxy)biphenyl of the above formula (VI) and pyromellitic dianhydride of the formula (VII).

The auxiliary diamine compound which is used for the process of the invention, excluding 4,4'-bis(3-aminophenoxy)biphenyl of the formula (VI), for example, compounds represented by the formula (VIII) wherein R₁ is an aliphatic radical, preferably an aliphatic radical having from 2 to 10 carbon atoms, more preferably ethylenediamine; R₁ is an alicyclic radical, preferably a radical represented by the formula

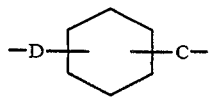

wherein C and D are individually an aliphatic radical having from 0 to 5 carbon atoms, more preferably 1,4-diaminocyclohexane; R₁ is a monoaromatic radical, preferably a radical represented by the formula

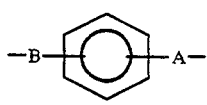

wherein A and B are individually an aliphatic radical having from 0 to 5 carbon atoms, more preferably m-phenylenediamine, o-phenylenediamine, p-phenylenediamine, m-aminobenzylamine and p-aminobenzylamine; R₁ is a condensed aromatic radical, preferably a radical represented by the formula

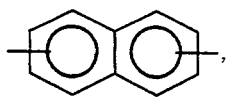

more preferably 2,6-diaminonaphthalene; R₁ is a noncondensed aromatic radical connected with each other through a direct bond, preferably a radical represented by the formula

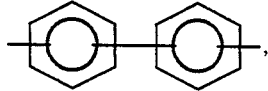

more preferably 4,4'-diaminobiphenyl; and R₁ is a noncondensed aromatic radical connected with each other through a bridge member, preferably a radical represented by the formula (b):

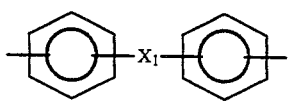 (b)

wherein X₁ is a direct bond, —CH₂—, $$-\underset{\underset{CH_3}{|}}{\overset{\overset{CH_3}{|}}{C}}-, \quad -\underset{\underset{CF_3}{|}}{\overset{\overset{CF_3}{|}}{C}}-,$$

—O—, —SO—, —SO₂—, —CO—,

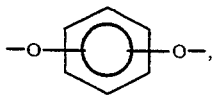

or the formula (c):

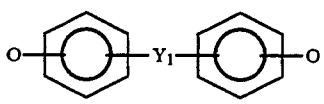

wherein $Y_1$ is a direct bond,

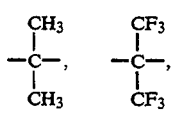

—S—, —O—, —SO—, —SO$_2$—, —CO—,

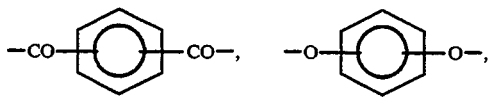

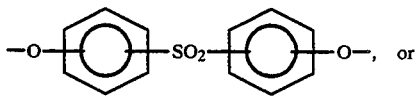

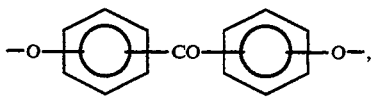

or the formula (d):

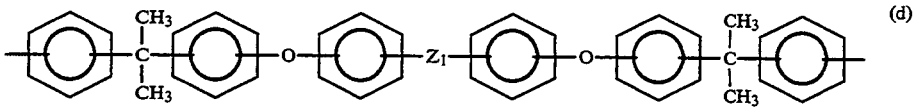

wherein $Z_1$ is a direct bond

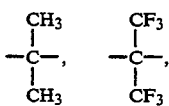

—S—, —O—, —SO—, —SO$_2$— or —CO—, more preferably bis(3-aminophenl) ether (3-aminophenyl) (4-aminophenyl) ether, bis(4-aminophenyl) ether, bis(3-aminophenyl) sulfide, (3-aminophenyl) (4-aminophenyl) sulfide, bis(4-aminophenyl) sulfide, bis(3-aminophenyl) sulfoxide, (3-aminophenyl) (4-aminophenyl) sulfoxide, bis(4-aminophenyl) sulfoxide, bis(3-aminophenyl) sulfone, (3-aminophenyl) (4-aminophenyl) sulfone, bis(4-aminophenyl) sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis[4-(3-aminophenoxy) phenyl]methane, bis[4-(4-aminophenoxy)-phenyl]methane, 1,1-bis[4-(3-aminophenoxy) phenyl]ethane, 1,1-bis[4-(4-aminophenoxy)phenyl]ethane, 1,2-bis[4-(3-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)-phenyl]propane, 2,2-bis[4-(3-aminophenoxy)phenyl]butane, 2,2-bis[4-(4-aminophenoxy)phenyl]butane, 2,2-bis[4-(3-aminophenoxyphenyl]1,1,1,3,3,3-hexafluoropropane, 2,2-bis[4-(4-aminophenoxy)phenyl]-1,1,1,3,3,3-hexafluoropropane, 1,3-bis-(3-aminophenoxy)benzene, 1,3-bis(4-aminophenoxy)benzene, 1,4-bis(3-aminophenoxy)benzene, 1,4-bis(4-aminophenoxy)benzene, bis[4-(3-aminophenoxy)phenyl] ketone, bis[4-(4-aminophenoxy)phenyl] ketone, bis[4-(3-aminophenoxy)phenyl] sulfide, bis[4-(4-aminophenoxy)phenyl] sulfide, bis[4-(3-aminophenoxy)phenyl] sulfoxide, bis[4-(4aminophenoxy)phenyl] sulfoxide, bis[4-(3-aminophenoxy)phenyl] sulfone, bis[4-(4-aminophenoxy)phenyl] sulfone, bis[4-(3-aminophenoxy)phenyl] ether, bis[4-(4-aminophenoxy)phenyl] ether, 1,4-bis[4-(3-aminophenoxy)benzoyl]benzene, 1,3-bis[4-(3-aminophenoxy)benzoyl]benzene, 4,4'-bis[4-(3-aminophenoxy)benzoyl]diphenyl ether, 4,4'-bis[3-(3-aminophenoxy) benzoyl]diphenyl ether, 4,4'-bis[4-(4-amino-α, α-dimethylbenzyl)phenoxy]benzophenone, 4,4'-bis[4-(4-amino-α, α-dimethylbenzyl) phenoxy]diphenyl sulfone, bis[4-{4-(4-aminophenoxy)phenoxy}-phenyl] sulfone and bis[4-{4-(4-aminophenoxy)phenoxy}phenyl] ketone. These diamine compounds can be used singly or in combination excluding 4,4'-bis(3-aminophenoxy)biphenyl having the formula (VI) which is used as a main material.

In these diamine compounds, a preferred compound is the diamine compound of the formula (VIII) wherein $R_1$ is a noncondensed aromatic radical connected with a bridge member, a more preferred compound is the diamine compound wherein the bridge member is oxygen, and the most preferred compound which is frequently used is bis(4-aminophenyl) ether.

Preferable diamine compounds include, for example, m-phenylenediamine, p-phenylenediamine, bis(3-aminophenyl) ether, (3-aminophenyl) (4-aminophenyl) ether, bis(4-aminophenyl) ether, 1,3-bis(3-aminophenoxy)benzene, 1,3-bis(4-aminophenoxybenzene), 1,4-bis(3-aminophenoxy)benzene and 1,4-bis(4-aminophenoxy)-benzene.

The auxiliary tetracarboxylic acid dianhydride which is used for the process of the invention, excluding pyromellitic dianhydride of the formula (VII), for example, compounds are represented by the formula (IX) wherein $R_2$ is an aliphatic radical, preferably a radical represented by the formula

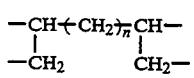

wherein n is an integer of from 0 to 5, more preferably ethylenetetracarboxylic dianhydride and butanetetracarboxylic dianhydride; $R_2$ is an alicyclic radical, preferably a radical represented by the formula

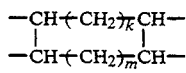

wherein k and m are individually integers of from 0 to 3, more preferably cyclopentanetetracarboxylic dianhydride; $R_2$ is a monoaromatic radical represented by the formula

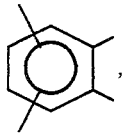

more preferably 1,2,3,4-benzenetetracarboxylic dianhydride; $R_2$ is a condensed polyaromatic radical, preferably a radical represented by the formula

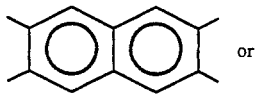 or

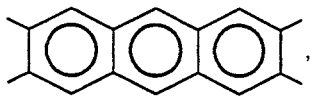, more preferably 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracenetetracarboxylic dianhydride and 1,2,7,8-phenanthrenetetracarboxylic dianhydride; $R_2$ is a noncondensed aromatic radical connected with each other through a direct bond, preferably a radical represented by the formula

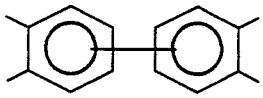, more preferably 3,3′, 4,4′-biphenyltetracarboxylic dianhydride and 2,2′, 3,3′-biphenyltetracarboxylic dianhydride; and $R_2$ is a noncondensed aromatic radical connected with each other through a bridge member, preferably a radical represented by the formula (d):

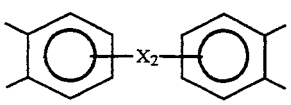 (d)

wherein $X_2$ is —O—, —S—, —SO—, —SO$_2$—, —CH$_2$—, —CO—,

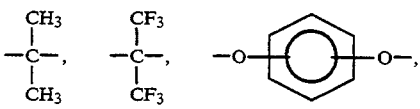

-continued

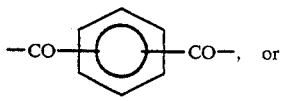, or

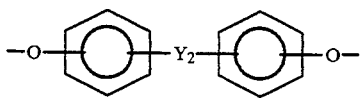

wherein $Y_2$ is a direct bond, —O—, —S—, —SO—, —SO$_2$—, —CH$_2$—, —CO—,

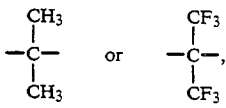, more preferably 3,3′, 4,4′-benzophenonetetracarboxylic dianhydride, 2,2′, 3,3′-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) ether dianhydride, bis(2,3-dicarboxyphenyl) ether dianhydride, bis(3,4-dicarboxyphenyl) sulfone dianhydride, bis(2,3-dicarbonxyphenyl) sulfone dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 1,1-bis(2,3-dicarboxyphenyl)ethane dianhydride, bis(2,3-dicarboxyphenyl)methane dianhydride, bis(3,4-dicarboxyphenyl)ethane dianhydride, 4,4′-(p-phenylenedioxy)diphthalic dianhydride and 4,4′-(m-phenylenedioxy)diphthalic dianhydride.

These tetracarboxylic acid dianhydrides can be used singly or in combination excluding pyromellitic dianhydride having the above formula (VII) which is used as a main material.

In these auxiliary tetracarboxylic acid dianhydrides, preferred compounds are 3,3′,4,4′-benzophenonetetracarboxylic dianhydride, 3,3′,4,4′-biphenyltetracarboxylic dianhydride, bis(3,4-dicarboxyphenyl) ether dianhydride and 4,4′-(p-phenylenedioxy)diphthalic dianhydride, and a more preferred compound which is frequently used is 3,3′,4,4′-biphenyltetracarboxylic dianhydride.

The diamine compound of the formula (VIII) and the tetracarboxylic acid dianhydride of the formula (IX) coexist in the reaction system as auxiliary materials in the process of the invention. When main materials are reacted in the presence of these auxiliary materials, several kinds of imide recurring structural units are formed between diamines composed of 4,4′-bis(3-aminophenoxy)biphenyl of the formula (VI) and the diamine compound of the formula (VIII) and anhydrides composed of pyromellitic dianhydride of the formula (VII) and the tetracarboxylic dianhydride of the formula (IX). The auxiliary units thus formed are assumed to be introduced into the main structural units of the formula (II) prepared from 4,4′-bis(3-aminophenoxy)biphenyl and pyromellitic dianhydride to build up a complex structure in the polymer chain. It is difficult to identify accurate structure of the resulting polymer chain. However, by varying the coexisting amounts of the auxiliary materials, i.e., the diamine compound and/or the tetracarboxylic acid dianhydride in the above range, crystallization speed can be freely controlled to give the polyimide of the invention having good processability and high crystallinity.

Either the diamine compound of the formula (VIII) or the tetracarboxylic dianhydride of the formula (IX) can be used singly. Alternatively, both compounds can be used as a mixture of an adequate proportion. Such kind of embodiments will hereinafter be referred to as "the diamine compound of the formula (VIII) and/or the tetracarboxylic acid dianhydride of the formula (IX)".

In the process of the invention, the amounts of the diamine compound of the formula (VIII) and the tetracarboxylic acid dianhydride of the formula (IX) which are used as auxiliary materials are respectively in the range of from 1 to 30 mol % per mole of 4,4'-bis(3-aminophenoxy)biphenyl of the formula (VI) and/or pyromellitic dianhydride of the formula (VII) which are main monomers of the invention. The total molar amount of the diamine compound of the formula (VIII) and/or the tetracarboxylic dianhydride of the formula (IX) which are used as auxiliary material is in the range of from 0.5 to 15 mol % per mole of the total monomer used in the invention.

When the total molar amount of the auxiliary materials used is less than 0.5 mol % per mole of the total monomer used, the processability of the polyimide having recurring structural units represented by the formula (II) cannot be improved. On the other hand, an amount exceeding 15 mol % gives an adverse effect on the high crystallinity of the polyimide having the recurring structural units of the formula (II). That is, the amounts of the auxiliary monomers are selected in the range of respectively 30 mol % or less per mole of 4,4'-bis(3-aminophenoxy)biphenyl and/or pyromellitic dianhydride which are main materials and at the same time the total molar amount of the auxiliary monomers is selected in the range of from 0.5 to 15 mol % per mole of the whole monomer. Thus highly crystalline polyimide can be freely prepared at a constant temperature with a desired crystallization speed and the object for improving the processability of polyimide and preparation of formed articles having excellent heat resistance can be achieved.

In the preparation process of polyimide in the invention, main materials of 4,4'-bis(3-aminophenoxy)biphenyl and pyromellitic dianhydride and auxiliary materials of the diamine compound represented by the formula (VIII) and/or the tetracarboxylic acid dianhydride represented by the formula (IX) are reacted to obtain polyamic acid.

No particular restriction is imposed on the method of reaction and the reaction is preferably carried out in an organic solvent.

The organic solvent which can be used for the reaction includes, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethanebis(2-methoxyethyl) ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, m-cresol, m-cresylic acid, p-cresol, o-cresol, p-chlorophenol and anisole. The organic solvent can be used singly or as a mixture.

The reaction temperature is usually 200° C. or lower, preferably 50° C. or lower. No particular limitation is placed on the reaction pressure. The reaction can be carried out satisfactorily even under atmospheric pressure. The reaction time differs depending upon the kind of solvent and the reaction temperature, and is usually from 4 to 24 hours.

The reaction results in a polyamic acid having recurring units represented by the formula (X):

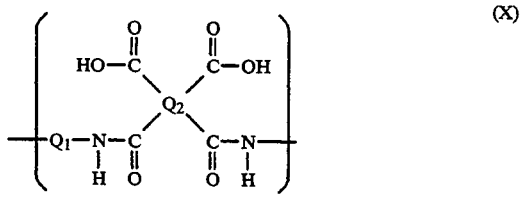

wherein $Q_1$ and $Q_2$ are radicals selected from the group consisting of an aliphatic, alicyclic, monoaromatic, condensed aromatic and noncondensed aromatic radical connected with each other through a direct bond or bridge member, $Q_1$ is a divalent radical, and $Q_2$ is a tetravalent radical.

More than 85 mol % of the above recurring units in the polyamic acid is composed of the units having the formula (XI):

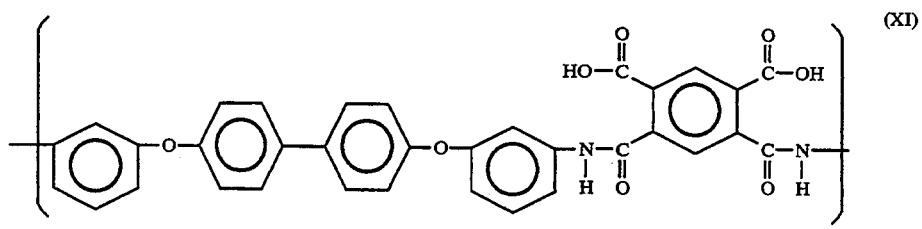

and from 0.5 to 15 mol % is composed of the units having the formula (XII) excluding the formula (XI) and/or the formulas (XIII) and/or (XIV):

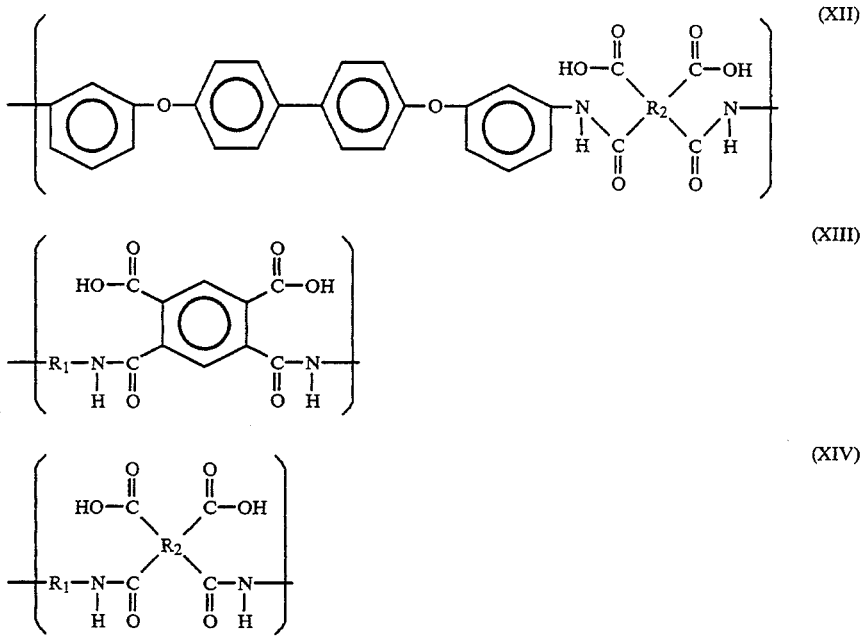

wherein R₁ and R₂ are radicals selected from the group consisting of an aliphatic, alicyclic, monoaromatic, condensed aromatic and noncondensed aromatic radical connected with each other through a direct bond or bridge member.

The polyamic acid thus obtained is imidized by heating at 100° to 400° C. or chemically imidized by using an imidizing agent such as acetic anhydride to obtain polyimide having structural units corresponding to those of the polyamic acid.

Polyimide can also be prepared by simultaneously conducting the formation of precursor polyamic acid and imidization of the polyamic acid. In the process, main materials of 4,4′-bis(3-aminophenoxy)biphenyl and pyromellitic dianhydride and auxiliary materials of the diamine compound of the formula (VIII) and/or the tetracarboxylic acid dianhydride of the formula (IX) are dissolved or suspended in an organic solvent and heated to obtain polyimide.

Further, the above reaction can also be carried out in the presence of phthalic anhydride. The amount of phthalic anhydride used is in the range of from 0.001 to 1.0 mole per mole of total diamine compounds used as main and auxiliary materials. When the amount is less than 0.001 mole, heat resistance at high temperatures cannot be obtained and troubles such as gelation occur due to molecular weight increase in the processing stage. On the other hand, an amount exceeding 0.1 mole lowers mechanical strength of the polyimide. More preferred amounts are in the range of from 0.001 to 0.5 mole.

The reaction in the presence of phthalic anhydride can be carried out by the following methods.

(1) After reacting pyromellitic dianhydride, 4,4′-bis(3-aminophenoxy)biphenyl and the diamine compound of the formula (VIII) and/or the tetracarboxylic acid dianhydride of the formula (IX), phthalic anhydride is added and the reaction is continued.

(2) Phthalic anhydride is reacted with a mixture of 4,4′-bis(3-aminophenoxy)biphenyl and the diamine compound of the formula (VIII), and successively pyromellitic dianhydride and optionally the tetracarboxylic acid dianhydride are added and the reaction is further continued.

(3) Pyromellitic dianhydride, 4,4′-bis(3-aminophenoxy)biphenyl, phthalic anhydride and the diamine compound of the formula (VIII) and/or the tetracarboxylic acid dianhydride of the formula (IX) are mixed and reacted at the same time.

The polyimide can also be prepared by suspending or dissolving 4,4′-bis(3-aminophenoxy)biphenyl, pyromellitic dianhydride, the diamine compound of the formula (VIII) and/or the tetracarboxylic acid dianhydride of the formula (IX), and phthalic anhydride in an organic solvent and by heating the mixture thus obtained to carry out formation of polyamic acid precursor and imidization of the precursor at the same time.

In the reaction system conducted in the presence of phthalic anhydride, phthalic anhydride can be partly replaced by other dicarboxylic acid anhydride so long as giving no adverse effect on the good physical properties of polyimide.

The dicarboxylic acid anhydride which can partly replace phthalic anhydride is a compound represented by the formula:

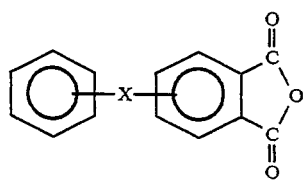

wherein X is a direct bond, —O—, —S—, —SO—, —SO₂—, —CH₂—, —CO—,

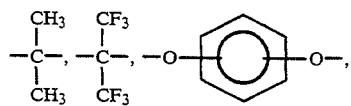

-continued

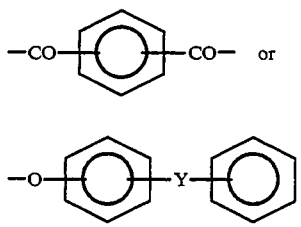

wherein Y is a direct bond, —O—, —S—, —SO—, —SO₂—, —CH₂—, —CO—,

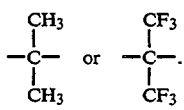

Exemplary dicarboxylic acid anhydride includes 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3anthracenedicarboxylic anhydride and 1,9-anthracenedicarboxylic anhydride.

Thus, polyimide having the recurring units represented by the formula (I) can be obtained by using conventionally known methods.

The polyimide thus obtained is melted at 360° to 430° C. and extruded into a filament. The extrudate is subsequently hot stretched from 2 to 4 times at 200° to 450° C., preferably at 200° to 350° C. to obtain a polyimide filament having great strength and high elastic modulus.

Polyimide filament can also be prepared by dissolving the precursor polyamic acid represented by the formula (X) into an organic solvent, preparing a polyamic acid fiber with a wet-spinning method, and successively subjecting it to heat-treatment to perform imide ring closure, or optionally by further carrying out hot stretching. Alternatively, polyimide filament can of course be prepared by subjecting the polyamic acid filament to imide ring closure by chemical methods and successively carrying out hot stretching.

For example, a N-methyl pyrrolidone solution of polyamic acid having a concentration of about 20% is delivered into a coagulation bath composed of a mixture of N-methylpyrrolidone and water at an output of 0.1 to 5.0 ml/min, wound up at a spinning rate of 1 to 20 m/min, and successively stretched from 1 to 3 times in water at 10° to 90° C. to obtain a polyamic acid filament.

The polyamic acid filament thus obtained can be subjected to imide ring closure by heat-treatment at 200° to 450° C. to obtain a polyimide filament. Alternatively, the polyamic acid filament obtained by wet spinning is immersed into a solvent mixture composed of a dehydration/ring-closing agent such as acetic anhydride and an imidizing catalyst such as pyridine and triethylamine to carry out previous imidization by chemical means, is the imidizing agent successively extracted, and the filament is dried in vacuum and further hot stretched from 1.01 to 3.0 times at 200° to 350° C. to obtain a polyimide filament having great strength and high elastic modulus.

In summary, the polyimide filament of the present invention can be prepared by melt spinning, or can also be prepared by wet spinning in the stage of polyamic acid precursor and thereafter thermally or chemically imidizing the resultant polyamic acid filament.

In the preparation of the polyimide film in the present invention, polyimide obtained as mentioned above is extruded through a slit die by using a screw type, piston type or gear pump type extruder. In the extrusion, the temperature of the polymer is in the range of usually from 300° to 450° C., preferably from 350° to 430° C. Extrusion temperatures below the range cause many troubles such as non-uniform melting of the polymer or high dependence of viscosity on temperature. On the other hand, extrusion temperature above the range is also unfavorable because the polymer is liable to decompose and appearance of the film is remarkably impaired.

The molten film delivered from the slit die is cooled on a casting roll having a surface temperature of from 100° to 280° C. to obtain a film having good flatness.

The amorphous film thus obtained can be converted to a polyimide film having great strength and high elastic modulus by stretching from 1.5 to 3.5 times in a temperature range of from 200° to 300° C. and successively heat-setting in a temperature range above 250° C. and below the melting point.

EXAMPLES

The present invention will hereinafter be illustrated further in detail by way of examples and comparative examples. In the examples and comparative examples, physical properties were measured by the following methods.

(1) Glass transition temperature (Tg), crystallization temperature (Tc) and crystal melting temperature (Tm):
Measured with DSC (Shimadzu Seisakusho, DT-40 Series, DSC-41M).

(2) Crystallinity:
Sample was crushed under refrigeration by using SPEX 6700/Freezer-Mill and measured with XRD (Rigakudenki, RAD-RVC Series, X-ray Diffraction Equipment).

EXAMPLE 1

To a reaction vessel equipped with a stirrer, reflux condenser, water separator and a nitrogen inlet tube, 1.9872 kg (5.4 moles) of 4,4'-bis(3-aminophenoxy)biphenyl, 0.12 kg (0.6 mole) of 4,4'-diaminodiphenyl ether, 1.2426 kg (5.7 moles) of pyromellitic dianhydride, 0.0888 kg (0.6 mole) of phthalic anhydride and 13.4 kg of cresylic acid were charged. The mixture was heated to 145° C. with stirring in a nitrogen atmosphere. About 200 cc of water was distilled out during the step. The mixture was reacted further for 4 hours at 145° C. and cooled to the room temperature. Thereafter 7 kg of methyl ethyl ketone was charged and filtered to obtain yellow polyimide powder. The polyimide powder was washed with methyl ethyl ketone and dried at 180° C. for 24 hours under reduced pressure to obtain 3.16 kg (98% yield) of polyimide powder.

The polyimide powder thus obtained was processed with an screw type extruder having a screw diameter of 25 mm and L/D of 24 at a cylinder temperature of 400°

C., and delivered through a nozzle of 3 mm in diameter. The resultant strand was allowed to cool and cut into pellets having a diameter of 2 mm and a length of 3 mm. The polyimide pellets had Tg of 259° C. Tc and Tm were not observed. Crystallinity was 0%.

In the next step, a screw type extruder having a screw diameter of 10 mm and L/D of 20 was used for spinning a filament by setting a die having a nozzle of 0.8 mm in diameter and fitting a 10 μm filter before the die.

The pellets obtained above was extruded at a cylinder temperature of 360° C. under a constant revolution of screw. A polyimide monofilament having a diameter of 100 μm was obtained by controlling the take up speed of the spun filament. The polyimide monofilament thus obtained was passed through a hot oven at 240° C. with stretching magnification of 2.5 and stretching velocity of 60 times/min (stretching to 60 times in length in a minute) to obtain a one-stage stretched filament. The stretched filament was heat treated under unstretched condition at 300° C. for 60 minutes in a hot oven to obtain a heat-treated stretched filament.

The polyimide filament thus obtained had a tensile strength of 26.8 g/d, elastic modulus of 2100 g/d, and a tensile elongation of 3.0% in accordance with JIS-L-1813 (1981).

The polyimide was crushed under refrigeration and crystallinity was measured with XRD. The crystallinity was 25.5%. Results are illustrated in Table 1.

EXAMPLE 2

To the same reaction vessel as used in Example 1, 2.208 kg (6 moles) of 4,4'-bis(3-aminophenoxy)biphenyl, 1.1183 kg (5.13 moles) of pyromellitic dianhydride, 0.1676 kg (0.57 mole) of 3,3',4,4'-biphenyltetracarboxylic dianhydride, 0.0888 kg (0.6 mole) of phthalic anhydride, and 13.4 kg of cresylic acid were charged.

The mixture thus obtained was treated by the same procedures as described in Example 1 to obtain 3.3 kg (98% yield) of yellow polyimide powder.

The polyimide powder thus obtained was processed with a screw type extruder having a screw diameter of 25 mm and L/D of 24 at a cylinder temperature of 400° C., and delivered through a nozzle of 3 mm in diameter. The resultant strand was allowed to cool and cut into pellets having a diameter of 2 mm and a length of 3 mm. The polyimide pellets had Tg of 255° C. Tc and Tm were not observed.

In the next step, a screw type extruder having a screw diameter of 10 mm and L/D of 20 was used for spinning a filament by setting a die having a nozzle of 0.8 mm in diameter and fitting a 10 μm filter before the die.

The pellets obtained above was extruded at a cylinder temperature of 360° C. at a constant screw revolution. A polyimide monofilament having a diameter of 100 μm was obtained by controlling the take up speed of the spun filament. The polyimide monofilament thus obtained was passed through a hot oven at 240° C. with stretching magnification of 2.5 and stretching velocity of 60 times/min to obtain a one-stage stretched filament. The stretched filament was heat treated under unstretched condition at 300° C. for 60 minutes in a hot oven to obtain a heat-treated stretched filament. The polyimide filament thus obtained had a tensile strength of 25.5 g/d, elastic modulus of 2000 g/d, tensile elongation of 3.1% and crystallinity of 25.0%. Results are illustrated in Table 2.

EXAMPLES 3-6

Polyimide powder was prepared by carrying out the same procedures as described in Example 1 except that 4,4'-diaminodiphenyl ether was replaced by other diamine compounds illustrated in Table 1.

The same spinning procedures as described in Example 1 were carried out by using the above polyimide powder to obtain polyimide monofilaments. Tensile strength, elastic modulus, tensile elongation and crystallinity of these monofilaments are summarized in Table 1.

EXAMPLES 7-9

Polyimide powder was prepared by carrying out the same procedures as described in Example 2 except that 3,3',4,4'-biphenyltetracarbxoylic dianhydride is replaced by other tetracarbxylic acid dianhydrides illustrated in Table 2.

The same spinning procedures as described in Example 2 were carried out by using the above polyimide powder to obtain polyimide monofilaments. Tensile strength, elastic modulus, tensile elongation and crystallinity of these monofilaments are summarized in Table 2.

TABLE 1

| | | Filament property | | | |
|---|---|---|---|---|---|
| Example | Diamine compound added (amount) | Tensile strength (g/d) | Elastic modulus (g/d) | Tensile elongation (%) | Crystallinity (%) |
| 1 | 4,4'-diaminodiphenyl ether (0.12 kg) (0.6 mole) | 26.8 | 2100 | 3.0 | 25.5 |
| 3 | 3,4'-diaminodiphenyl ether (0.12 kg) (0.6 mole) | 26.0 | 2000 | 3.1 | 24.5 |
| 4 | 3,3'-diaminodiphenyl ether (0.12 kg) (0.6 mole) | 25.5 | 1900 | 3.2 | 23.0 |
| 5 | bis[4-{4-(4-aminophenoxy)phenoxy}-phenyl]sulfone (0.3696 kg) (0.6 mole) | 26.7 | 2300 | 2.5 | 25.5 |
| 6 | 4,4'-bis[4-(4-amino-α,α-dimethylbenzyl)phenoxy]-diphenyl sulfone (0.401 kg) (0.6 mole) | 25.1 | 2200 | 2.8 | 22.5 |

TABLE 2

| Example | Tetracarboxylic acid dianhydride added (amount) | Tensile strength (g/d) | Elastic modulus (g/d) | Tensile elongation (%) | Crystallinity (%) |
| --- | --- | --- | --- | --- | --- |
| 2 | 3,3',4,4'-biphenyl-tetracarboxylic dianhydride (0.1676 kg) (0.57 mole) | 25.5 | 2000 | 3.1 | 25.0 |
| 7 | 3,3',4,4'-benzophenone-tetracarboxylic dianhydride (0.1835 kg) (0.57 mole) | 25.0 | 2100 | 2.9 | 25.5 |
| 8 | 3,3',4,4'-diphenyl-ethertetracarboxylic dianhydride (0.1767 kg) (0.57 mole) | 25.8 | 1900 | 3.3 | 23.5 |
| 9 | 4,4'-(p-phenylene-dioxy)diphthalic dianhydride (0.2291 kg) (0.57 mole) | 26.0 | 1800 | 4.5 | 23.0 |

EXAMPLES 10-18

Polyimide pellets of Examples 1–9 were prepared by carrying out the same procedures as described in Example 1.

These pellets were respectively dried at 180° C. for 24 hours, fed to a 50 mm extruder, heat-melted in the temperature range of 360° to 380° C. and delivered through a slit die having width of 500 mm and die gap of 0.5 mm. The molten mass thus extruded was adhered to a casting roll having a surface temperature of 220° C. and cooled to obtain various kinds of films having thickness of about 100 μm.

Tensile strength, tensile elastic modulus and tensile elongation are illustrated in Table 3. Any of these films had crystallinity of 0% by XRD measurement.

EXAMPLES 19-27

Films obtained in Examples 10–18 were cut into 100 mm square and set on a batch type biaxial stretching apparatus (Iwamoto Seisakusho, BIX-703, Model 400° C.), heated for 15 minutes in a temperature range of 265° to 275° C., and stretched 2.0×2.0 times simultaneously to two rectangular directions at a rate of 10 mm/sec at the same temperature. The film thus obtained was still set on the apparatus as intact and heated to 300° C. Heat treatment was conducted at 300° C. for 60 minutes to obtain a stretched film having thickness of about 25 μm.

Tensile strength, tensile elastic modulus, tensile elongation and crystallinity of the film obtained are illustrated in Table 4.

TABLE 3

| Example | Example of polyimide pellet | Forming* temperature range (°C.) | Tensile strength (kg/mm²) | Tensile elastic modulus (kg/mm²) | Tensile elongation (%) |
| --- | --- | --- | --- | --- | --- |
| 10 | 1 | 63 | 12.8 | 265 | 100 |
| 11 | 2 | 58 | 11.5 | 251 | 102 |
| 12 | 3 | 54 | 11.3 | 245 | 101 |
| 13 | 4 | 64 | 13.2 | 263 | 121 |
| 14 | 5 | 53 | 10.5 | 255 | 105 |
| 15 | 6 | 48 | 11.5 | 273 | 113 |
| 16 | 7 | 51 | 12.3 | 280 | 125 |
| 17 | 8 | 60 | 10.8 | 252 | 103 |
| 18 | 9 | 65 | 12.6 | 268 | 115 |

Note: *Films were prepared by varying film forming temperature. Film forming temperature was gradually lowered at a rate of 0.5° C./min. $T_1$ is the temperature when extrusion of the unmelted portion was initiated. Similarly, film forming temperature was gradually raised at a rate of 0.5° C./min. $T_2$ is the temperature when bubbles were generated and impairment of film appearace was initiated. Then, the difference $T_2-T_1$ (°C.) is defined as forming temperature range. In Example 10, $T_1$ was 355° C., $T_2$ was 418° C. and forming temperature range was 63° C.

TABLE 4

| Example | Example of film | Tensile strength (kg/mm²) | Tensile elastic modulus (kg/mm²) | Tensile Elongation (%) | Crystallinity (%) |
| --- | --- | --- | --- | --- | --- |
| 19 | 10 | 23.5 | 450 | 21 | 16.3 |
| 20 | 11 | 21.1 | 425 | 25 | 17.5 |
| 21 | 12 | 19.8 | 415 | 35 | 18.3 |
| 22 | 13 | 24.3 | 473 | 19 | 19.1 |
| 23 | 14 | 23.5 | 464 | 18 | 19.8 |
| 24 | 15 | 22.3 | 455 | 21 | 20.3 |
| 25 | 16 | 19.8 | 421 | 23 | 19.5 |
| 26 | 17 | 24.3 | 471 | 16 | 20.5 |
| 27 | 18 | 21.5 | 458 | 23 | 18.5 |

Comparative Example 1

To the same reaction vessel as used in Example 1, 2.208 kg (6 moles) of 4,4'-bis(3-aminophenoxy)biphenyl, 1.2426 kg (5.7 moles) of pyromellitic dianhydride, 0.0888 kg (0.6 mole) of phthalic anhydride and 13.4 kg of cresylic acid were charged. The same procedures as described in Example 1 were carried out to obtain 3.27 kg (98.5% yield) of yellow polyimide powder.

The polyimide powder obtained was pelletized by the same procedures as carried out in Example 1 to obtain pellets of 2 mm in diameter and 3 mm in length. The polyimide pellets had Tg of 260° C., Tc of 312° C. and Tm of 388° C.

The pellets were tried to prepare a polyimide filament at 360° C. by the same procedures as described in Example 1. However, rating torque of the extruder was exceeded and filament could not be extruded. Then extruding temperature was raised to 400° C. and a filament of 100 μm in diameter could be prepared by carrying out the same procedures as described in Example 1.

The polyimide monofilament thus obtained was passed through a hot oven at 240° C. with a stretching magnification of 2.5 times at a stretching rate of 60 times per minute to obtain a one-stage stretched filament. The stretched filament was heat treated in an unstressed state at 300° C. for 60 minutes in a hot oven to obtain a heat-treated, stretched filament.

The polyimide filament thus obtained had a tensile strength of 24.4 g/d, elastic modulus of 2100 g/d, elongation of 3.2% and crystallinity of 25.1%.

Comparative Example 2

To the same reaction vessel as used in Example 1, 1.325 kg (3.6 moles) of 4,4'-bis(3-aminophenoxy)biphenyl, 0.480 kg (2.4 moles) of 4,4'-diaminodiphenyl ether, 1.2426 kg (5.7 moles) of pyromellitic dianhydride, 0.0888 kg (0.6 mole) of phthalic anhydride and 13.4 kg of cresylic acid were charged.

The mixture thus obtained was reacted by the same procedures as carried out in Example 1 to obtain 2.89 kg (99.0% yield) of polyimide powder.

The polyimide powder thus obtained was used to try to prepare polyimide pellets at 360° C. by the same procedures as described in Example 1. However, the rating torque of the extruder was exceeded and extrusion could not be carried out. Then extruding temperature was raised to 420° C. and the polyimide powder was pelletized, spun into a filament, stretched and heat-treated by the same procedures as described in Example 1 to obtain a stretched and heat-treated filament.

The polyimide filament thus obtained had a tensile strength of 15.5 g/d, elastic modulus of 1500 g/d, tensile elongation of 4.1% and crystallinity of 5.3%, which values were inferior to those of the inventive Examples.

Comparative Example 3

The polyimide pellets obtained in Comparative Example 1 were used to try to prepare a film by carrying out the same procedures as described in Example 10. However, the pellets could not be extruded at 360° C. Extrusion temperature (forming temperature range) was measured by the same procedures as described in Examples 10-18. The temperature range which can provide good film was from 395° to 418° C., that is, forming temperature range was 23° C. The range was much narrower than those of Examples 10-18.

The film obtained had a tensile strength of 13.5 g, tensile modulus of 270 kg/mm² and tensile k/mm² elongation of 100%.

The film was subjected to simultaneously biaxial stretching by the same procedures as carried out in Example 19. The stretched film thus obtained had a tensile strength of 25.7 kg/mm², tensile elastic modulus of 455 kg/mm², tensile elongation of 33% and crystallinity of 24%.

Comparative Example 4

A polyimide film was used to try to prepare from the polyimide pellets used in Comparative Example 2 by carrying out the same procedures as described in Example 10. However, extrusion was difficult to carry out at temperature from 360° to 380° C. Then the extrusion temperature was gradually raised and a film could be extruded at temperature from 420° to 430° C. Bubbles were formed at a temperature above 430° C. and the film could not be formed. The film extruded at 420° to 430° C. was referred to as an extruded film. The extruded film was used to try to conduct simultaneously biaxial stretching by the same procedures as described in Example 19. However, stretching magnification is limited to 1.5 times. The film thus obtained was referred to as stretched film.

Physical properties of the extruded film and stretched film are illustrated in Table 5.

The stretched film had an inferior tensile strength and low crystallinity as compared with those of the inventive examples.

TABLE 5

| Film | Tensile strength (kg/mm²) | Tensile modulus (kg/mm²) | Tensile elongation (%) | Crystallinity (%) |
|---|---|---|---|---|
| Extruded | 12.3 | 275 | 75 | 0 |
| Stretched | 14.1 | 303 | 5 | 3 |

The present invention can provide formed articles, that is, a polyimide filament and polyimide film having great strength, high elastic modulus and high crystallinity which are composed of a novel polyimide having good processability.

We claim:

1. A formed polyimide article which is a filament or film and which comprises a polyimide essentially consisting of recurring structural units represented by the formula (I):

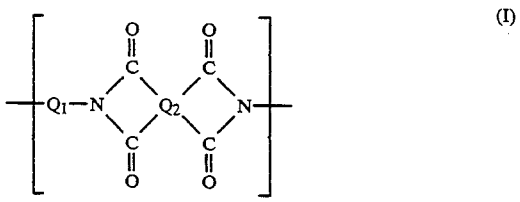

wherein $Q_1$ and $Q_2$ are radicals selected from the group consisting of an aliphatic, alicyclic, monoaromatic and condensed aromatic radical and noncondensed aromatic radical connected with each other through a direct bond or bridge member, $Q_1$ is a divalent radical and $Q_2$ is a tetravalent radical, more than 85 mol % of said polyimide consisting of recurring structural units of the formula (II):

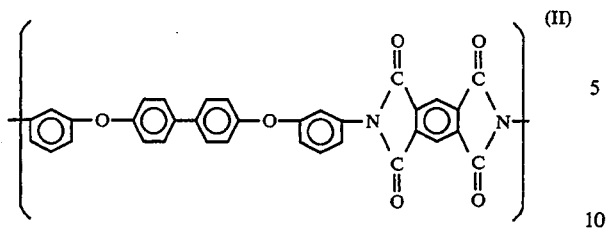

(II)

and from 0.5 to 15 mol % of said polyimide consisting of recurring structural units exclusive of formula (II) and represented by the formula (III), the formula (IV) and-/or the formula (V):

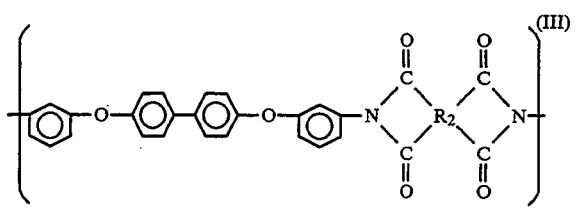

(III)

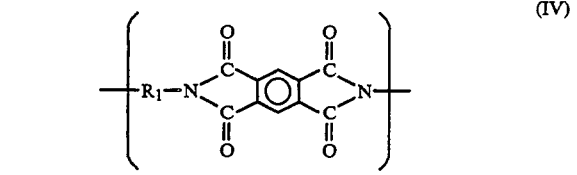

(IV)

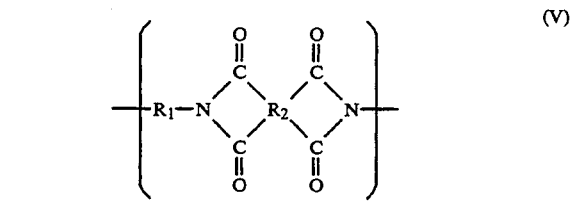

(V)

wherein $R_1$ and $R_2$ are radicals selected from the group consisting of an aliphatic, alicyclic, monoaromatic, condensed aromatic radical and noncondensed aromatic radical connected with each other through a direct bond or bridge member, $R_1$ is a divalent radical and $R_2$ is a tetravalent radical and wherein when said formed polyimide article is a filament, said filament is obtained by hot stretching a polyimide filament from 2 to 4 times at a temperature of from 200° to 450° C. and when said formed polyimide article is a film, said film is obtained by extruding the polyimide through a slit die at a polymer temperature of from 300° to 450° C. with an extruder selected from a screw, a piston or a gear and stretching the resultant film 1.5 to 3.5 times at a temperature of from 200° to 300° C. and successively heat-setting the stretched film at a temperature above 250° C. and below the melting point of the polyimide.

2. The formed polyimide article of claim 1 wherein the formed article is a polyimide filament.

3. The formed polyimide article of claim 1 wherein the formed article is a polyimide film.

4. The formed polyimide article of claim 1 wherein the polyimide is obtained by conducting the condensation of 4,4'-bis(3-aminophenoxy)biphenyl having the formula (VI):

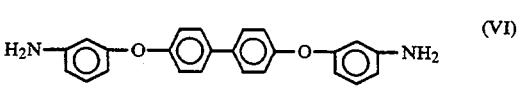

(VI)

and pyromellitic dianhydride having the formula (VII):

(VII)

in the presence of a diamine compound represented by the formula (VIII):

$$H_2N-R_1-NH_2 \quad \text{(VIII)}$$

wherein $R_1$ is a divalent radical selected from the group consisting of an aliphatic, alicyclic, monoaromatic and condensed aromatic radical and noncondensed aromatic radical connected with each other through a direct bond or bridge member, and the diamine compound of the formula (VI) is excluded, and/or a tetracarboxylic acid dianhydride represented by the formula (IX):

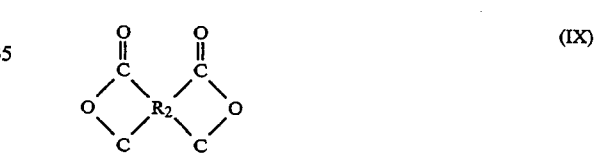

(IX)

wherein $R_2$ is a tetravalent radical selected from the group consisting of an aliphatic, alicyclic, monoaromatic and condensed aromatic radical and noncondensed aromatic radical connected with each other through a direct bond or bridge member and the pyromellitic acid dianhydride of the formula (VII) is excluded.

5. The formed polyimide article of claim 4 wherein the diamine compound represented by the formula (VIII) is at least one compound, the diamine compound of the formula (VI) exclusive, selected from the group consisting of compounds wherein $R_1$ is a radical selected from an aliphatic radical having from 2 to 10 carbon atoms, an alicyclic radical represented by the formula

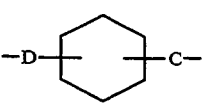

wherein C and D are individually an aliphatic radical having from 0 to 5 carbon atoms, a monoaromatic radical represented by the formula

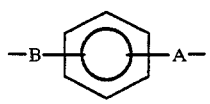

wherein A and B are individually an aliphatic radical having from 0 to 5 carbon atoms, a condensed aromatic radical represented by the formula

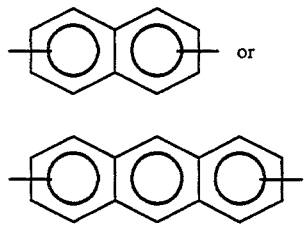

and a noncondensed aromatic radical connected each other through a direct bond or a bridge member and represented by the formula (b):

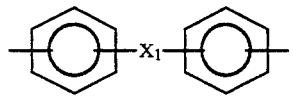 (b)

wherein $X_1$ is a direct bond, —$CH_2$—,

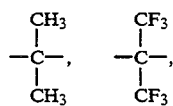

—S—, —O—, —SO—, —$SO_2$—, —CO—,

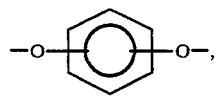

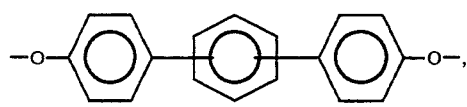

or by the formula (c):

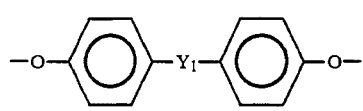 (c)

wherein $Y_1$ is a direct bond,

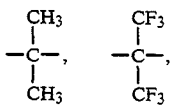

—S—, —O—, —SO—, —$SO_2$—, —CO—,

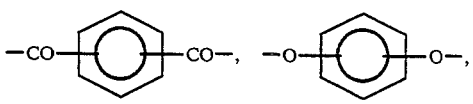

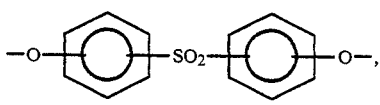

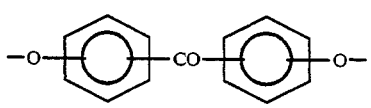

or by the formula (d):

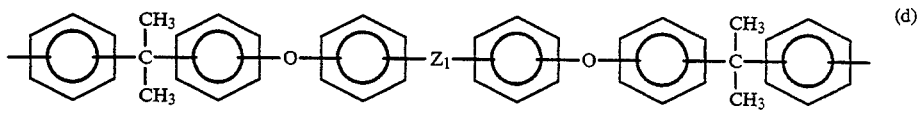 (d)

wherein $Z_1$ is a direct bond,

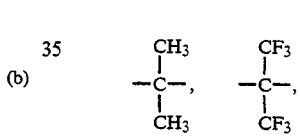

—S—, —O—, —SO—, —$SO_2$—, —CO—.

6. The formed polyimide article of claim 4 wherein the tetracarboxylic acid dianhydride represented by the formula (IX) is at least one compound, the tetracarboxylic acid dianhydride of the formula (VII) exclusive, selected from the group consisting of compounds wherein $R_2$ is an aliphatic radical represented by the formula

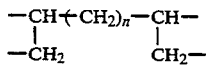

wherein n is an integer of from 0 to 5, an alicyclic radical represented by the formula

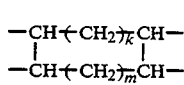

wherein k and m are individually an integer of from 0 to 3, a monoaromatic radical represented by the formula

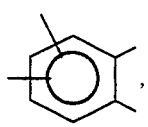

a condensed aromatic radical represented by the formula

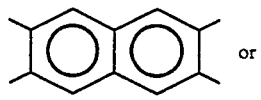 or

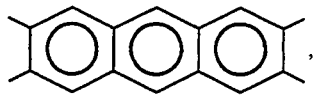, and a non-condensed aromatic radical connected with each other through a direct bond or a bridge member and represented by the formula (e):

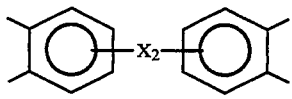 (e)

wherein $X_2$ is a direct bond —O—, —S—, —SO$_2$—, —CH$_2$—, —CO—,

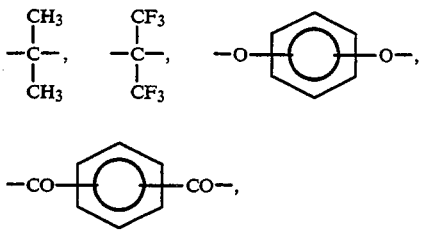

or by the formula (f):

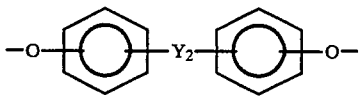 (f)

wherein $Y_2$ is a direct bond, —O—, —S—, —SO$_2$—, —CH$_2$—, —CO—,

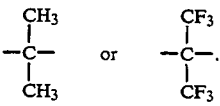

7. The formed polyimide article of claim 4 wherein the amounts of the diamine compound of the formula (VIII) and/or the tetracarboxylic acid of the formula (IX) are respectively in the range of from 1 to 30 mol % per mole of the main monomers 4,4'-bis(3-aminophenoxy)biphenyl of the formula (VI) and/or pyromellitic dianhydride of the formula (VII), and the total molar amount of the diamine compound of the formula (VIII) and/or the tetracarboxylic acid anhydride of the formula (IX) which are auxiliary materials in the range of from 0.5 to 15 mol % per mole of the total monomer.

8. The formed polyimide article of claim 1 wherein the polyimide is prepared from a polyamic acid by heat-imidizing at 100°–400° C. or by chemically imidizing with an imidizing agent including acetic anhydride and has recurring units corresponding to the recurring units of the polyamic acid; said polyamic acid has recurring units represented by the formula (X):

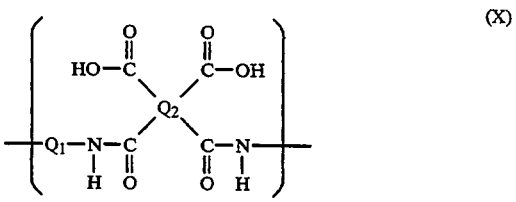 (X)

wherein $Q_1$ and $Q_2$ are radicals selected from the group consisting of an aliphatic, alicyclic, monoaromatic, condensed aromatic and noncondensed aromatic radical connected with each other through a direct bond or bridge member, $Q_1$ is a divalent radical, and $Q_2$ is a tetravalent radical; and more than 85 mol % of said recurring units is composed of the unit having the formula (XI):

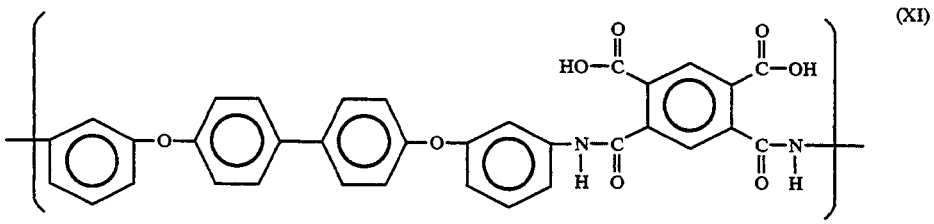 (XI)

and from 0.5 to 15 mol % of said recurring units is composed of the unit represented by the formula (XII), the formula (XI) exclusive, and/or the formula (XIII) and/or the formula (XIV):

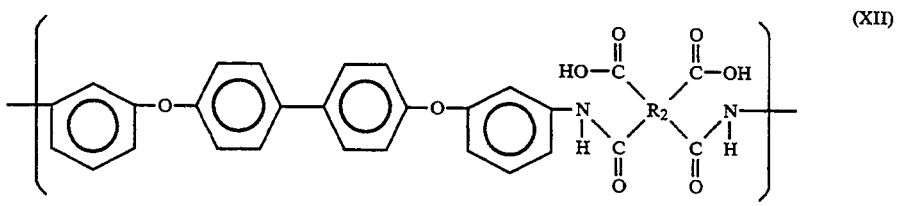 (XII)

-continued

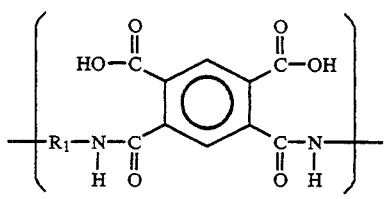

(XIII)

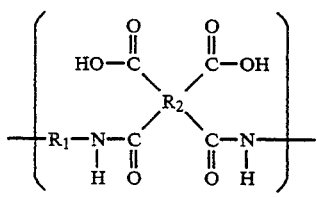

(XIV)

wherein $R_1$ and $R_2$ are radicals selected from the group consisting of an aliphatic, alicyclic, monoaromatic, condensed aromatic and noncondensed aromatic radical connected with each other through a direct bond or bridge member, $R_1$ is a divalent radical and $R_2$ is a tetravalent radical.

9. The formed polyimide article of claim 8 wherein polyamic acid is obtained by reacting 4,4'-bis(3-aminophenoxy)biphenyl, pyromellitic dianhydride and diamine compound of the formula (VIII) and/or tetracarboxylic acid dianhydride of the formula (IX) in the presence of at least one organic solvent selected from the group consisting of N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl] ether, tetrahydrofuran, 1,3-dioxane, 1,4-dioxane, pyridine, picoline, dimethyl sulfoxide, dimethyl sulfone, tetramethylurea, hexamethylphosphoramide, phenol, m-cresol, cresylic acid, p-cresol, o-cresol, p-chlorophenol and anisole.

10. The formed polyimide article of claim 8 wherein the polyimide is prepared by suspending or dissolving 4,4'-bis(3-aminophenoxy)biphenyl, pyromellitic dianhydride and the diamine compound of the formula (VIII) and/or the tetracarboxylic acid dianhydride of the-formula (IX) in an organic solvent and thereafter by conducting formation and simultaneous imidization of the polyamic acid precursor of polyimide.

11. The formed polyimide article of claim 10 wherein the polyimide is obtained by conducting the formation and imidization of the polyamic acid in the presence of phthalic anhydride.

12. The formed polyimide article of claim 11 wherein the polyimide is obtained by using phthalic anhydride in the range of from 0.001 to 1.0 mole per mole of the total diamine compound used as main and auxiliary materials.

13. The formed polyimide article of claim 11 wherein the polyimide is obtained in the reaction system conducted in the presence of phthalic anhydride by replacing a portion of said phthalic anhydride with another dicarboxylic acid anhydride.

14. The formed polyimide article of claim 13 wherein other dicarboxylic acid anhydride used for replacing the portion is at least one compound selected from the group consisting of anhydrides represented by the formula:

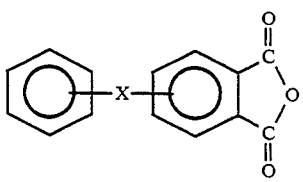

wherein X is a direct bond, —O—, —S—, —SO$_2$—, —CH$_2$—, —CO—,

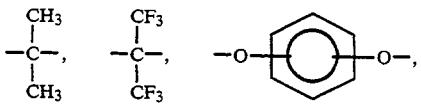

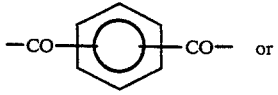

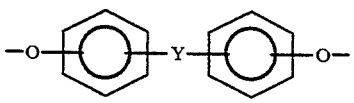

wherein Y is a direct bond, —O—, —S—, —SO$_2$—, —CH$_2$—, —CO—,

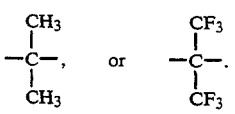

15. The formed polyimide article of claim 2 wherein the polyimide filament is obtained by melt-extruding the polyimide at a temperature of from 360° to 430° C.

16. The formed polyimide article of claim 2 wherein the polyimide filament is obtained by preparing a polyamic acid filament with a wet spinning process using an organic solvent solution and successively by cyclizing to the polyimide by heat-treatment before subjecting the filament to said hot-stretching.

17. The formed polyimide article of claim 2 wherein the polyimide filament is obtained by chemically cyclizing a polyamic acid filament to the polyimide before subjecting the filament to said hot-stretching.

18. A preparation process of a polyimide filament comprising melt-extruding polyimide essentially consisting of recurring structural units represented by the formula (I):

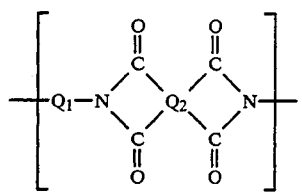

wherein $Q_1$ and $Q_2$ are radicals selected from the group consisting of an aliphatic, alicyclic, monoaromatic and condensed aromatic radical and noncondensed aromatic radical connected with each other through a direct bond or bridge member, $Q_1$ is a divalent radical and $Q_2$ is a tetravalent radical, more than 85 mol % of said polyimide consisting of recurring structural units of the formula (II):

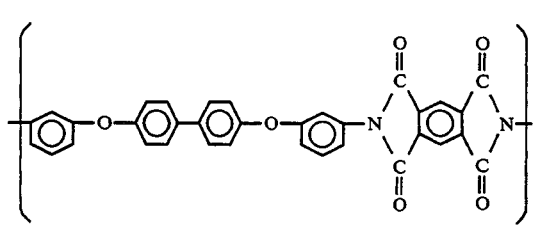

and from 0.5 to 15 mol % of said polyimide consisting of recurring structural units exclusive of formula (II) and represented by the formula (III), the formula (IV) and/or the formula (V):

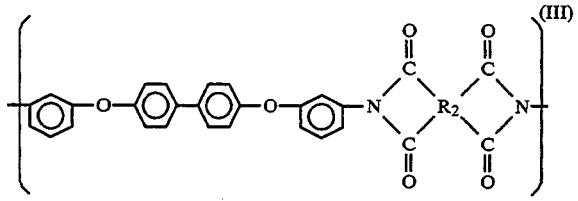

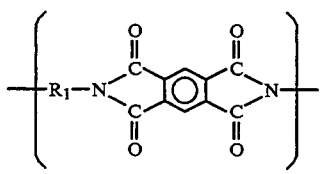

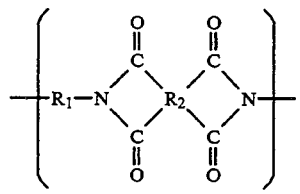

wherein $R_1$ and $R_2$ are radicals selected from the group consisting of an aliphatic, alicyclic, monoaromatic, condensed aromatic radical and noncondensed aromatic radical connected with each other through a direct bond or bridge member, $R_1$ is a divalent radical and $R_2$ is a tetravalent radical wherein said filament is obtained by melt-extruding the polyimide at a temperature of from 360° to 430° C. and hot stretching the resultant filament from 2 to 4 times at from 200° to 450° C.

19. A preparation process of a polyimide film comprising melt-extruding polyimide essentially consisting of recurring structural units represented by the formula (I):

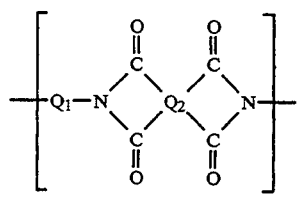

wherein $Q_1$ and $Q_2$ are radicals selected from the group consisting of an aliphatic, alicyclic, monoaromatic and condensed aromatic radical and noncondensed aromatic radical connected with each other through a direct bond or bridge member, $Q_1$ is a divalent radical and $Q_2$ is a tetravalent radical, more than 85 mol % of said polyimide consisting of recurring structural units of the formula (II):

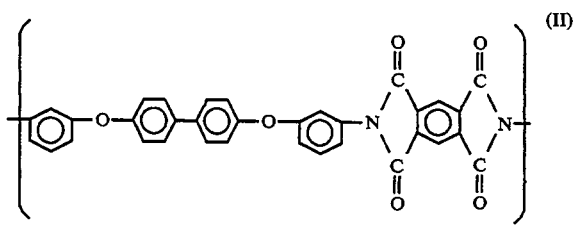

and from 0.5 to 15 mol % of said polyimide consisting of recurring structural units exclusive of formula (II) and represented by the formula (III), the formula (IV) and/or the formula (V):

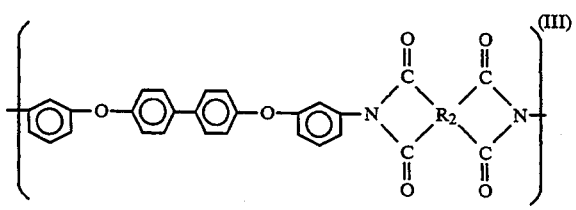

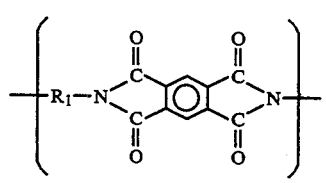

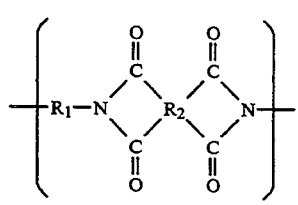

wherein $R_1$ and $R_2$ are radicals selected from the group consisting of an aliphatic, alicyclic, monoaromatic, condensed aromatic radical and noncondensed aromatic radical connected with each other through a direct bond or bridge member, $R_1$ is a divalent radical and $R_2$ is a tetravalent radical wherein said film is obtained by extruding the polyimide through a slit die at a polymer temperature of from 300° to 450° C. with an extruder selected from a screw, a piston or a gear and stretching the resultant film 1.5 to 3.5 times at a temperature of from 200° to 300° C. and successively heat-setting the stretched film at a temperature above 250° C. and below the melting point of the polyimide.

* * * * *

UNITED STATES PATENT AND TRADEMARK OFFICE
CERTIFICATE OF CORRECTION

PATENT NO. : 5,374,708
DATED : December 20, 1994
INVENTOR(S) : Shoji TAMAI et al.

It is certified that error appears in the above-indentified patent and that said Letters Patent is hereby corrected as shown below:

Claim 14, column 30, line 30, "-O-, -S-, -SO$_2$-," should be -- -O-, -S-, -SO-, SO$_2$-,--.

Claim 14, column 30, line 48, "-O-, -S-, -SO$_2$-," should be -- -O-, -S-, -SO-, SO$_2$-,--.

Signed and Sealed this

Twelfth Day of September, 1995

Attest:

BRUCE LEHMAN

*Attesting Officer*  *Commissioner of Patents and Trademarks*